United States Patent [19]

Murata et al.

[11] Patent Number: 4,656,981
[45] Date of Patent: Apr. 14, 1987

[54] BALANCING MECHANISM FOR RECIPROCATING PISTON ENGINE

[75] Inventors: Nobuyoshi Murata, Miki; Toru Ogino, Kobe, both of Japan

[73] Assignee: Kawasaki Jukogyo Kabushiki Kaisha, Kobe, Japan

[21] Appl. No.: 810,230

[22] Filed: Dec. 18, 1985

Related U.S. Application Data

[63] Continuation of Ser. No. 641,608, Aug. 17, 1984, abandoned.

[30] Foreign Application Priority Data

Aug. 24, 1983 [JP] Japan ................................. 58-130843

[51] Int. Cl.$^4$ ............................................. F02B 75/06
[52] U.S. Cl. .................................... 123/192 B; 74/604
[58] Field of Search ...................... 123/192 B, 196 R; 74/603, 604

[56] References Cited

U.S. PATENT DOCUMENTS

| 1,410,019 | 3/1922 | Krause | 123/192 B |
| 2,235,160 | 3/1941 | Ljungstrom | 123/192 B |
| 3,457,804 | 7/1969 | Harkness | 123/192 B |

FOREIGN PATENT DOCUMENTS 3120190  5/1982  Fed. Rep. of Germany ... 123/192 B

Primary Examiner—Ira S. Lazarus
Attorney, Agent, or Firm—Marshall, O'Toole, Gerstein, Murray & Bicknell

[57] ABSTRACT

This disclosure relates to a balancing mechanism for preventing vibration of a reciprocating piston internal combustion engine. The balancing comprises a pair of eccentric journals on the crankshaft, each having an axis spaced to the side of the crankshaft axis which is opposite the crankpin. A pair of arms are journaled on the journals and carry a counterbalance. Guide means is mounted in the crankcase for confining the counterweight to reciprocate on the cylinder axis in directions reverse to the piston motion as the crankshaft rotates.

2 Claims, 3 Drawing Figures

FIG_1

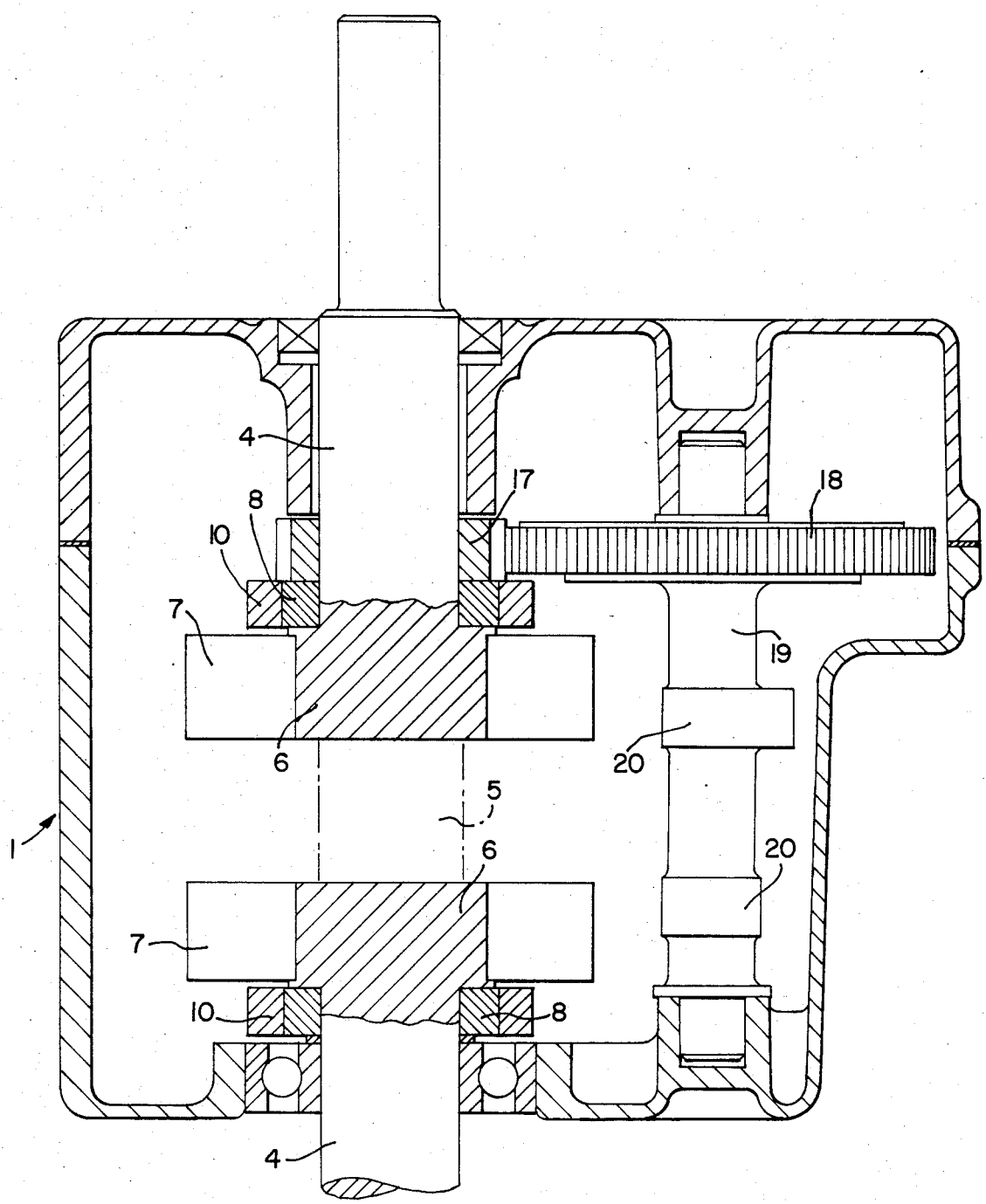
FIG_3_

BALANCING MECHANISM FOR RECIPROCATING PISTON ENGINE

This a continuation of application Ser. No. 06/641,608, filed Aug. 17, 1984, now abandoned.

BACKGROUND OF THE INVENTION

The present invention relates to a reciprocating piston type of internal combustion engine, and particularly to such an engine having a balancing mechanism for preventing vibration of the engine.

Internal combustion engines have recently been made smaller and more lightweight by increasing the rotational speed of the crankshaft, thereby, of course, increasing the frequency of reciprocation of the piston and other parts. This new design also increases the forces and moments of inertia of the parts, causing disadvantageous vibrations of the engine.

An attempt to counterbalance the forces and prevent such vibrations is shown in Harkness U.S. Pat. No. 3,457,804, wherein a counterbalance is supported by arms on eccentric journals fastened to the crankshaft, the counterbalance being on the side of the crankshaft which is opposite to the cylinder. A link is pivotally connected to the counterbalance and to a wall of the crankcase. As the crankshaft rotates, the counterbalance moves in an arc having its center at the pivotal connection to the crankcase and therefore the counterbalance cannot move completely axially of the cylinder. This arcuate motion produces forces in the counterbalance which exceed the mass of the reciprocating parts such as the piston. As a result, the inertia forces of the reciprocating parts are not balanced, and the vibrations along and transverse to the cylinder axis are not effectively reduced.

It is a general object of this invention to provide an improved balancing mechanism for such an engine, including a counterbalance which moves axially of the cylinder in order to balance the inertia forces of the piston and other reciprocating parts of the engine.

BRIEF SUMMARY OF THE INVENTION

A balancing mechanism in accordance with this invention is for use in a reciprocating piston internal combustion engine which includes a cylinder, a piston reciprocatable in the cylinder, a crankcase, a crankshaft mounted in the crankcase, a crankpin connected to the piston, and a pair of crank arms bridging the crankshaft and crankpin.

The balancing mechanism comprises eccentric journal means on the crankshaft adjacent the crank arms, the journal means having an axis spaced to the side of the crankshaft axis which is opposite from said crankpin. A counterbalance arm means is carried by the eccentric journal means and is connected to the counterbalance. Guide means is mounted on the crankcase and engages the counterbalance and confines the counterweight to reciprocating movement on the cylinder axis, the counterbalance moving in directions reverse to the piston motion as the crankshaft rotates.

BRIEF DESCRIPTION OF THE DRAWINGS

A preferred embodiment of the present invention is shown in the figures of the accompanying drawings, wherein:

FIG. 3 is a sectional view taken on the line 3—3 of FIG. 1.

DETAILED DESCRIPTION OF THE DRAWINGS

Figure 1:
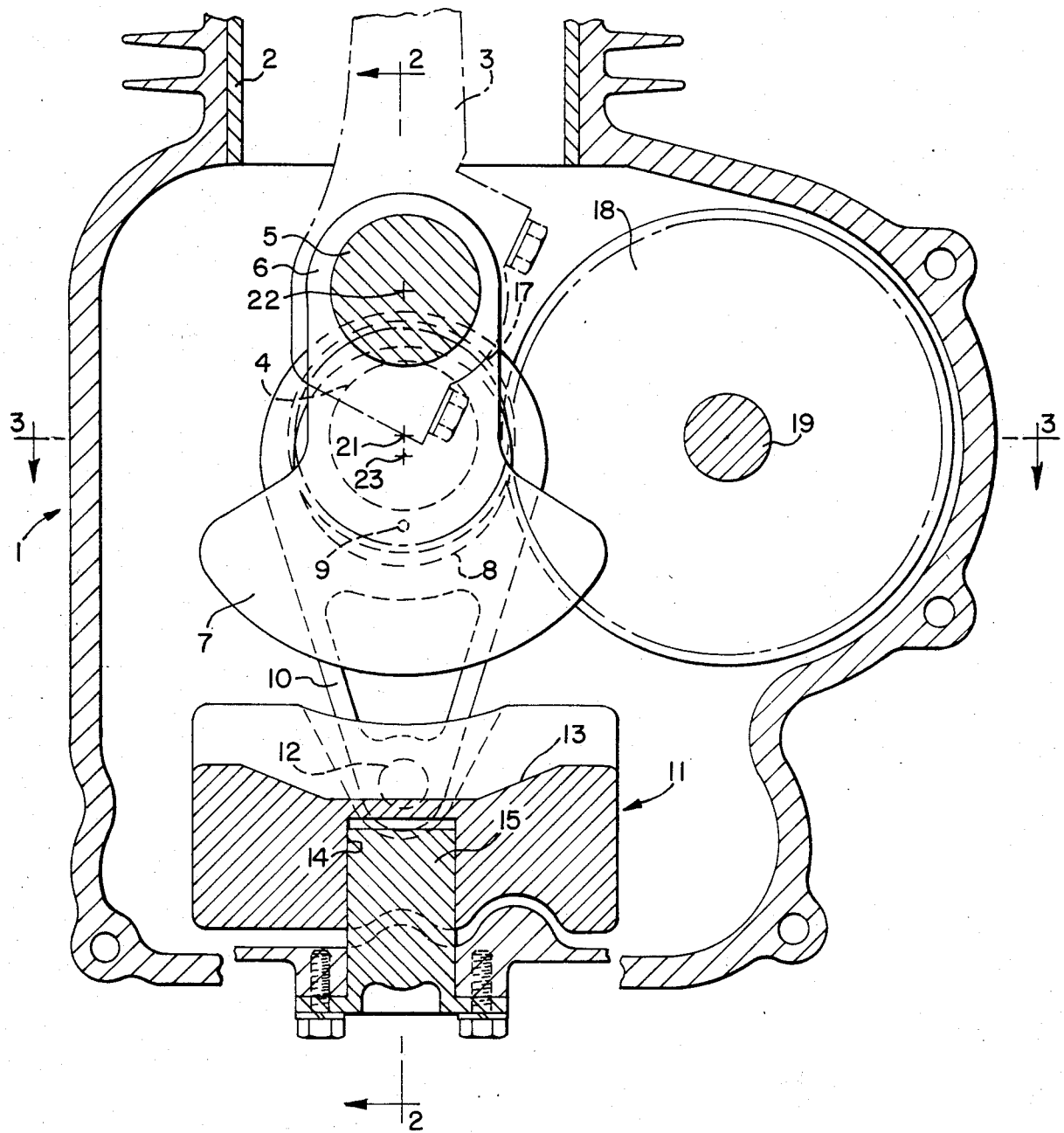
FIG. 1 is a sectional view taken on the line 1—1 in FIG. 2 showing part of a vertical-cylinder engine including a balancing mechanism embodying the invention.

The engine in the specific example illustrated includes a crankcase 1, a vertical cylinder 2 on the upper side of the crankcase, a connecting rod 3 connected to a piston 2A (FIG. 2) in the cylinder 2, a horizontal crankshaft 4, a crankpin 5, and a pair of crank arms 6. The rotational axis of the crankshaft 4 is indicated at 21 and the center of the crankpin 5 is indicated at 22. Each crank arm 6 has an enlargement forming a counterweight 7 on the opposite side of the crankshaft 4 from the crankpin 5. The counterweights 7 may be generally the same as those shown in the U.S. Pat. No. 3,457,804 and are constructed to counterbalance the moment of rotation of the crankpin 5 section around the crankshaft 4. Fixed on the crankshaft 4 is a crank gear 17 which engages with a timing gear 18 (FIGS. 1, 3) mounted on a camshaft 19, which has cams 20 for operating the engine valves (not shown).

Fixed to the outer side of each crank arm 6 by a pin 9 is an eccentric journal 8, which is rotatably mounted on the crankshaft 4. The journals 8 have an axis 23 (FIG. 1) spaced to the side of the crankshaft axis 21 which is opposite the crankpin 5. Journaled on each journal 8 is a vertically extending connecting arm 10, the upper end of which pivots on the axis 23 as the crankshaft 4 rotates.

Figure 2:
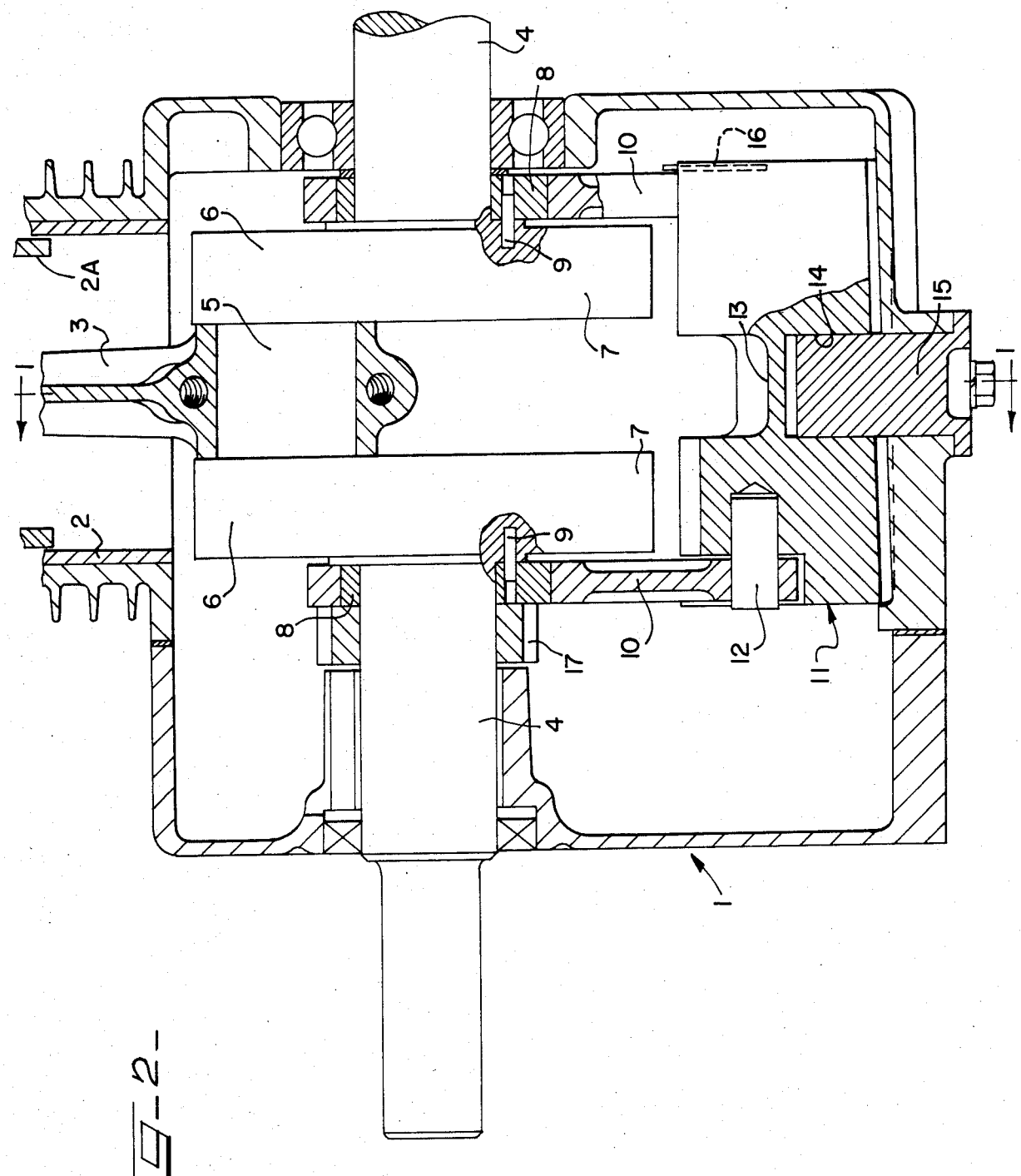
FIG. 2 is a sectional view taken on the line 2—2 of FIG. 1.

Suspended from the lower ends of the two arms 10 by pivot pins 12 is a counterbalance or balance weight 11 which is located below the crank arms 6. The weight 11 may be rectangular in plan view, and have an upper recess 13 located to avoid contact by the lower end of the connecting rod 3. The weight 11 has a vertical opening or hole 14 formed in its lower side which is adjacent the crankcase 1, for sliding engagement with a vertical guide pin 15 fixed to the bottom of the crankcase 1 coaxially below the cylinder 2. A side wall of the weight 11 preferably engages a stop 16 secured to the crankcase 1, to prevent the weight from rotating about the pin 15. As shown in FIGS. 1 and 2, the vertical axis of the pin 3, which is preferably cylindrical, extends through the axis 21 and the cylinder axis.

In operation, the piston 2A reciprocates in the cylinder 2, rotating the crankshaft 4 and the eccentric journals 8. As a result, the connecting arms 10 vertically reciprocate the balance weight 11 along the axis of the guide pin 15. The weight 11 moves a maximum vertical distance equal to twice the distance between the axes 21 and 23. At the top dead center of the piston (FIGS. 1 and 2), which is the uppermost position of the crankpin 5, the axes 23 of the journals 8 are the farthest downwardly from the crankpin 5, and the connecting arms 10 and the weight 11 are at the lowermost positions, and vice versa. Thus, as the piston moves upwardly, the weight 11 is lowered below and coaxially with the piston, and vice versa.

As a result, the weight 11 produces inertia forces which are 180° out of phase with the piston motion. These forces are commensurate with the mass of the reciprocating parts such as the piston, without producing vibrations transverse to and along the cylinder axis.

Consequently, the inertia forces of the reciprocating parts are balanced, without producing vibration axially of the cylinder 2, and consequently the piston, etc. reciprocate without vibration. This reduces the noise of the engine and the wear of the moving parts.

Since the weight 11 is on the cylinder axis, and symmetrical about a plane which is on the cylinder axis and normal to the crankshaft axis, the inertia forces of the weight 11 are balanced about the cylinder axis, and thereby do not produce a vibration-causing couple.

Although the engine is shown here as being of the vertical-cylinder type, the invention is equally applicable to horizontal-cylinder engines.

What is claimed is:

1. A balancing mechanism for a reciprocating piston internal combustion engine which includes a cylinder, a piston reciprocatable in said cylinder, a crankcase, a crankshaft mounted in said crankcase, a crankpin connected to said piston, and a pair of crank arms bridging said crankshaft and crankpin, said crank arms and said crankpin rotating with said crankshaft during operation and forming a rotating mass, said balancing mechanism comprising at least one rotating counterweight attached to and rotating with said crankshaft, eccentric journal means on said crankshaft adjacent said crank arms and rotating with said crankshaft, said journal means having an axis spaced to the side of the crankshaft axis which is opposite from said crankpin, said rotating counterweight and said eccentric journal means counterbalancing said rotating mass, a reciprocating counterbalance, counterbalance arm means carried by said eccentric journal means and connected to said reciprocating counterbalance, said reciprocating counterbalance moving in directions reverse to the piston motion as said crankshaft rotates, and guide means mounted on said crankcase and engaging said reciprocating counterbalance and confining said reciprocating counterweight to reciprocating movement on the cylinder axis, said guide means comprising a hole in the lower side of said reciprocating counterbalance adjacent said crankcase, and a pin adapted to be secured to the bottom of said crankcase and extend substantially coaxially with said cylinder for sliding engagement within said hole, whereby said hole and said pin are adjacent the bottom of said crankcase and are thereby adapted to be lubricated by lubricant at the bottom of said crankcase.

2. A balancing mechanism for a reciprocating piston internal combustion engine, comprising a crankcase, a crankshaft rotatably mounted in said crankcase, a cylinder in said crankcase on one side of said crankshaft, a reciprocating piston in said cylinder, said cylinder having an axis, a crankpin and crank arms connecting said piston with said crankshaft and connected to rotate said crankshaft, a rotating counterbalance connected to and rotating with said crankshaft, a reciprocating counterbalance on the opposite side of said crankshaft and adjacent said crankcase, eccentric journal means connected to and rotating with said crankshaft, said rotating counterbalance means and said journal means combining to counterbalance said crankpin and said crank arms, means connecting said reciprocating counterbalance with said journal means for moving said reciprocating counterbalance on said axis in directions which are reverse to the directions of movement of said piston, and guide means attached to said crankcase and slidably engaging said reciprocating counterbalance and confining the movement of said reciprocating counterbalance on an axis which is parallel with the axis of said cylinder, said guide means comprising a cylindrical guide pin secured to the bottom of said crankcase and having an axis substantially coinciding with said cylinder axis, and a hole in said reciprocating counterbalance adjacent the bottom of said crankcase which slidably receives said guide pin, whereby said guide means is adjacent the bottom of said crankcase and thereby is adapted to be lubricated by lubricant at the bottom of said crankcase.

* * * * *